United States Patent [19]

Hayashi

[11] 4,333,221
[45] Jun. 8, 1982

[54] METHOD FOR PRODUCING A CHANNEL SHAPED TRIM

[75] Inventor: Keizo Hayashi, Nagoya, Japan
[73] Assignee: Toyoda Gosei Co., Ltd., Nagoya, Japan
[21] Appl. No.: 144,453
[22] Filed: Apr. 28, 1980
[30] Foreign Application Priority Data May 31, 1979 [JP] Japan .................................. 54/67868

[51] Int. Cl.³ .............................................. B32B 31/16
[52] U.S. Cl. ........................................ 29/413; 27/417; 27/527.4; 156/200; 156/211; 156/244.12; 156/257
[58] Field of Search ...................... 29/417, 413, 527.2, 29/527.4; 156/200, 211, 244.12, 257

[56] References Cited

U.S. PATENT DOCUMENTS 2,761,202  9/1956  Beare ...................................... 29/417
3,222,769 12/1965  Le Plae .................................. 29/413
3,780,152 12/1973  Friesner ...................... 156/244.12 X Primary Examiner—Milton S. Mehr
Attorney, Agent, or Firm—Cushman, Darby & Cushman

[57] ABSTRACT

A method for producing a channel-shaped trim including a core member embedded within a covering material and having a longitudinally extending opening for embracing and clamping an edge flange of a support member comprising the steps of perforating a plurality of transversely extending slits of which length is made larger at predetermined intervals in a band-shaped metallic plate to form unslit connecting portions of which width is made narrower at predetermined intervals in both side end portions thereof, rolling the unslit connecting portions in a longitudinal direction thereof to form a core member, covering the core member with a covering material, breaking the core member in the narrower connecting portions to divide into a plurality of core pieces, and bending the covered and divided core member into a desired cross-sectional shape of the opening.

5 Claims, 12 Drawing Figures

METHOD FOR PRODUCING A CHANNEL SHAPED TRIM

BACKGROUND OF THE PRESENT INVENTION

The present invention relates to a trim used for protecting, trimming and sealing edge portions, joint portions and the like of automobiles, furniture and the like or used for attaching weather stripping or other similar articles to various types of straight or curved structures.

In the trim of the above described type, a core member is embedded in a main body of rubber or synthetic resin in order to provide good shape-retentivity thereof.

The trim is required to be flexible and deformable in accordance with the contour of the place where the trim is to be attached.

Therefore, the core member embedded in the trim must not obstruct the trim from readily and freely bending or twisting.

In order to satisfy the above described demands, various types of core members have been used or proposed.

Conventional core members D and E as shown in FIG. 1 and FIG. 2 are obtained by punching a metallic plate by means of a punch.

The conventional core member D comprises a large number of strip-shaped members 1 which are integrally connected by bridge portions 2a in the central portions thereof in a width direction of the core member D.

In the conventional core member E, a large number of strip-shaped members 1 are integrally connected by bridge portions in both end portions thereof.

And by covering such a core member as described above with a covering material such as rubber or synthetic resin, and bending it so as to have a desired cross-sectional shape such as a u-shape, a channel-shaped trim can be obtained.

These core members can be produced easily. And they are so strong that they do not deform when they are covered with the covering material.

Futhermore, trims wherein these core members are embedded have good shape-retentivity.

However, these conventional trims cannot be freely expanded nor contracted in a longitudinal direction thereof. And also, they do not bend flexibly.

Another conventional core members F and G as shown in FIG. 3 and FIG. 4 overcome the above described defect of the conventional core members D and F.

In the conventional core member F as shown in FIG. 3, a large number of transversely extending slots 31 having the same length in a transverse direction of the trim are perforated in the metallic plate at predetermined intervals to form bridge portions 2c in both side end portions of the thin plate.

And in the spaces between both ends of the slots 31 and both side edges of the plate, a large number of concave portions 4 are provided to form thin walled portions which are easily broken by an outer force.

And after the core member F is covered with a covering material, an outer force is applied to the covered core member so as to break it in the concave portions 4. As a result, the trim wherein strip-shaped core pieces are disconnectedly embedded can be obtained.

The conventional core member G as shown in FIG. 4, is formed by perforating a large number of transversely extending slots 32 having the same length in a transverse direction of the core member G, in a band-shaped metallic plate at predetermined intervals and providing narrow bridge portions 2d in both sides of the slots 32 in a transverse direction of the metallic plate.

And after the core member G is covered with a covering material, the covered bridge portions 2d are removed from the covered core member from alternate long and two short dashes lines drawn on FIG. 4 by means of cutting or scraping means.

As a result, a trim wherein a large number of strip-shaped core pieces are embedded disconnectedly can be obtained.

The trim comprising the above described core members F and G can freely expand, contract and bend. However, it is difficult to determine the depth of the concave portions 4 to be perforated in the core member F. If the concave portions 4 are perforated too deep, the core member F is easily broken or deformed in the process of supplying it to the covering process or in the following process of covering the core member. As a result, production efficiency is largely lowered.

And if the concave portions 4 are perforated too shallow, the core member F cannot be broken with ease when the outer force is applied to the covered core member.

And in order to obtain a trim comprising the core member G, the process of removing the bridge portions 2d is required additionally.

Since the bridge portions 2d are removed after the core member G is covered, considerably large volume of the material for the core member and covering material is wasted so that the cost of the obtained trim becomes increased.

Furthermore, in the trim comprising the core member G, the core member is exposed from both side edges of the trim so that the core member is apt to rust. And also when the trim is attached to some structures, they are in danger of being damaged by the exposed core member.

And in each of the core members F and G, the strip-shaped core pieces which are embedded in a covering material disconnectedly are apt to slip relative to each other therewithin.

For example, when the trim including the core members F or G is attached to a curved place having a large curvature, the covering material of the curved inner surface of the trim becomes wrinkled since the core pieces are piled up with each other therein.

Accordingly, an object of the present invention is to provide an improved method for producing a trim which flexibly deforms, freely expands and contracts in accordance with the contour of the place to which it is to be attached, with desirable shape-retentivity.

Another object of the present invention is to provide an improved method for producing a trim wherein disconnectedly arranged core pieces are embedded without slipping relative to each other with good production efficiency.

BACKGROUND OF THE DRAWINGS

Other objects and advantages of the invention will become apparent from the following description of the preferred embodiments together with reference to the accompanying drawings wherein.

DETAILED DESCRIPTION

Figure 1:
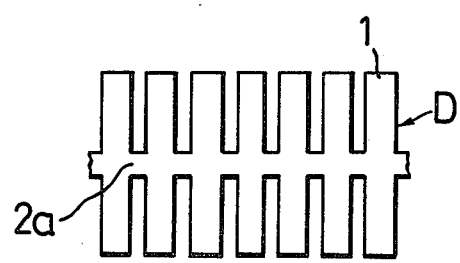
FIG. 1 to FIG. 4 are partially cut-away perspective views of conventional core members used in the conventional trims.
Figure 2:
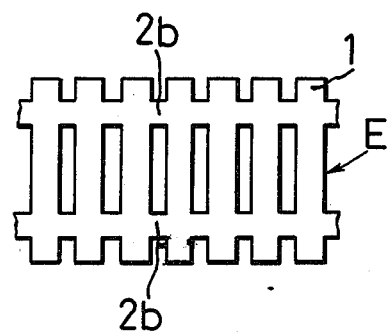
Figure 3:
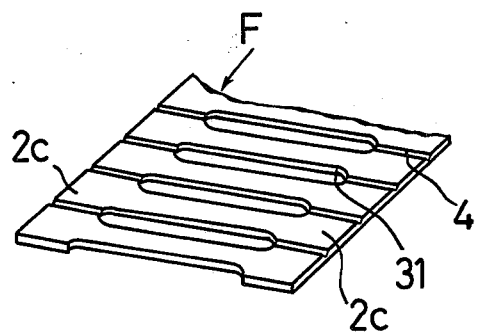
Figure 4:
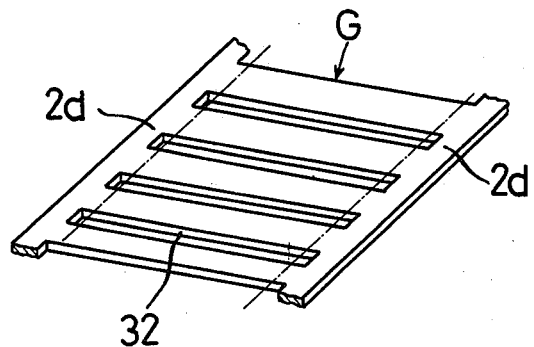

According to the present invention, a large number of transversely extending slits are perforated in a band-shaped metallic plate in a longitudinal direction thereof at predetermined intervals. The length of the slits is made larger every at least two slits.

And a series of unslit connecting portions are formed in both side end portions of the metallic plate. The width of the series of unslit connecting portions is made narrower at predetermined intervals in accordance with the length of the transversely extending slits.

In this step, these slits are perforated only in a transversely central portion of the metallic plate except the both side end portions thereof or in addition to these slits (central slits) perforated in the central portion of the metallic plate, another two sets of a plurality of transversely extending slits (side slits) are perforated in both side edges of the metallic plate so as to be opposed to the central slits respectively in line in a transverse direction of the metallic plate.

In the former case, the connecting portions are formed in the spaces between both ends of each of the slits and both side edges of the metallic plate.

In the latter case, between both ends of each of the central slits and an end of each of side slits, the connecting portions are formed. In this case, by changing the length of the central slits or the side slits, the width of the connecting portions is made narrower at predetermined intervals.

Next, the connecting portions are rolled in a longitudinal direction of the metallic plate by means of a roller or the like, the metallic plate is elongated in a longitudinal direction thereof and each of the transversely extending slits is enlarged to form a slot having a predetermined width in a longitudinal direction of the metallic plate.

As a result, a band-shaped core member wherein a plurality of transversely extending slots are arranged in a longitudinal direction thereof at predetermined intervals can be obtained with high production efficiency.

Then, the core member as described above is covered with a covering material such as rubber or synthetic resin, and a bending force is applied to the covered core member in a vertical direction thereof.

As a result, the core member is easily broken in narrower connecting portions of the both side end portions of the metallic plate. Within the covering material, the core member is divided into a plurality of core pieces, each of which is composed of a plurality of strip-shaped portions opposed to each other through the transversely extending slots, and connecting portions connecting the strip-shaped portions in both ends thereof.

Then, the obtained core pieces embedded within the covering material is bent so as to have a desired cross-sectional shape. As a result, a channel-shaped trim having a longitudinally extending opening for embracing and clamping an edge flange of a support member is obtained.

The obtained trim wherein a plurality of core pieces are disconnectedly embedded, freely expands or contracts and flexibly bends as desired.

Since each of slots of the core pieces and spaces between the core pieces are charged with the covering material, the core pieces do not slip relative to the other core pieces even if the trim of the present invention is attached to the curved place having a large curvature.

As a result, the trim of the present invention has good shape-retentivity.

Furthermore, in the inner curved surface of the trim, wrinkle can be substantially prevented from occurring so that the external appearance of the trim is maintained good even when it is attached to a curved place.

Hereinafter, the present invention will be explained in accordance with embodiments with reference to the accompanied drawings.

EMBODIMENT 1

Figure 5:
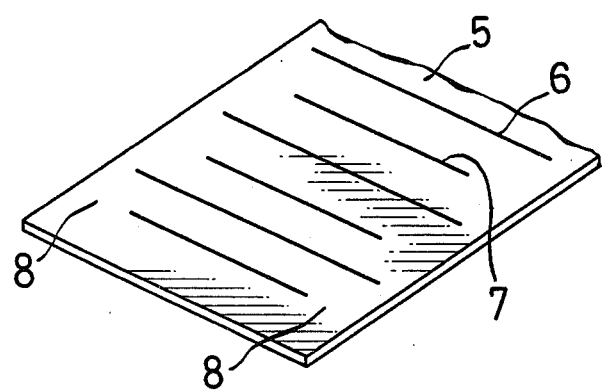
FIG. 5 is a partially cut-away perspective view of a band-shaped metallic plate for use in a core member of a first embodiment of the present invention.

As shown in FIG. 5, a transversely extending long slits 6 and a transversely extending short slits 7 are alternately perforated in a band shaped metallic plate 5 in a longitudinal direction thereof at predetermined intervals.

These slits are perforated easily by means of slitter rolls. In both side end portions of the thin plate 5, a series of connecting portions 8 are formed in a longitudinal direction thereof. The width of each of the connecting portions is made narrower every two slits.

Figure 6:
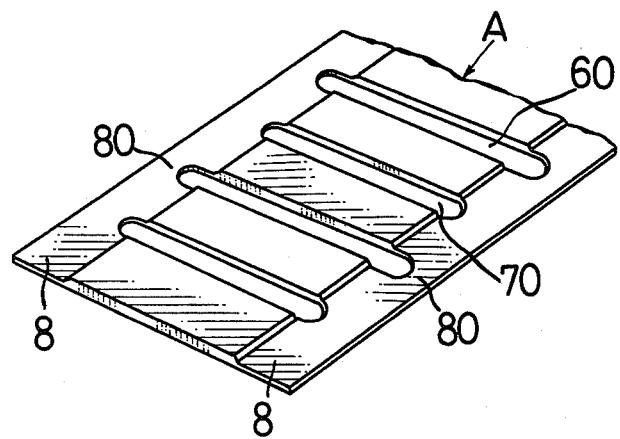
FIG. 6 is a partially cut-away perspective view of a core member obtained from the metallic plate as shown in FIG. 5.

Next, the connecting portions 8 is rolled in a longitudinal direction thereof by means of roll means to make the connecting portions 8 thin as shown in FIG. 6.

The metallic plate 5 is elongated in a longitudinal direction thereof. As a result, the slits 6 and 7 are enlarged to form transversely extending slots 60 and 70 and in both sides of the slots 60 having a larger length, narrower connecting portions 80 having narrower width are formed.

The core member A which is obtained in such a manner as described above is wound up in a winding drum and is supplied to a trim producing process.

Figure 7:
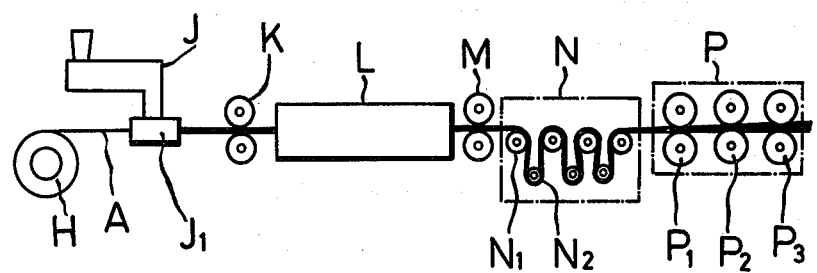
FIG. 7 is a diagram showing the producing process of the trim of the present invention.
Figure 8:
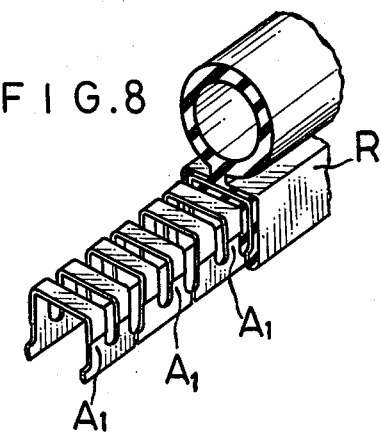
FIG. 8 is a partially cut-away perspective view of the trim wherein the core member of the present invention is embedded.

FIG. 7 shows the trim producing process. The trim producing process comprises the steps of extruding the core member A which is supplied from the winding drum H, together with the covering material of resin which is supplied from an extruder J by means of a crosshead J₁, decorating the surface of the extruded covered core member with an emboss pattern by means of embossing rollers K, vulcanizing the patterned covered core member through a vulcanizing oven, dividing the vulcanized covered core member which is supplied through receiving rollers M, into a plurality of core pieces by means of a dividing machine and bending the divided covered core member into a desired cross-sectional shape such as a U-shape by means of a bending-roll machine P.

In the dividing machine N, a plurality of rollers $N_1$ having large diameter and rollers $N_2$ having small diameter are provided and the vulcanized covered core member is extended between these rollers.

The diameter of each of the rollers $N_1$ is increased gradually into a progressing direction of the covered core member or the rotating speed of each of the rollers $N_1$ is increased gradually. Therefore, the covered core member is pulled into a progressing direction thereof. And also, bending force is repeatedly applied to the covered core member by the rollers $N_2$. As a result, the core member A is broken and divided into a plurality of core pieces in narrower connecting portions 80 as shown in FIG. 6.

The bending-roll machine P is provided with a plurality of pair of rollers $P_1$, $P_2$ and $P_3$. The space formed between each of opposed rollers $P_1$, $P_2$ and $P_3$ is changed so that the covered core member gradually formed into a trim having a desired cross-sectional shape such as a U-shape.

And if synthetic resin is used as a covering material, the vulcanizing step is unnecessary.

Furthermore, if the emboss pattern is not required in the surface of the trim, the above described decorating step is unnecessary.

In the trim obtained by the above described process, a plurality of core pieces $A_1$ which is composed of a pair of bent strip-shaped thin plates connected in both ends thereof are formed within the covering material R. These core pieces $A_1$ are arranged in a longitudinal direction of the trim at small intervals.

As described above, according to the first embodiment, the core pieces including a slot therein can be produced with very ease by rolling the unslit connecting portions formed in the both side end portions of the metallic plate wherein a plurality of slits are centrally perforated in a longitudinal direction thereof.

Since the rolled core member has thin portions in both unslit side portions of the plate, it can be easily bent in the dividing step even after the core member is covered with the covering material.

Furthermore, the width of the connecting portions in a transverse direction is made narrower at predetermined intervals. Therefore, the bending force is concentrated into these narrower connecting portions, so that the core member is broken in these portions with very ease and certainty.

And the trim wherein the core member is divided into core pieces within the covering material as described above exhibits excellent elasticity and flexibility.

Each of the core pieces is surrounded by a covering material and each of the long slots is charged with a covering material. Therefore, even if the trim of the first embodiment is attached to a place having a large curvature, the core pieces do not slip relative to each other within the trim. As a result, the trim of the first embodiment exhibits good shape-retentivity.

Furthermore, even if the trim is bent in accordance with the contour of the place, the core pieces are not piled up with each other. Therefore, wrinkles and unevenness can be prevented from occurring in the curved inner surface of the trim.

EMBODIMENT 2

Figure 9:
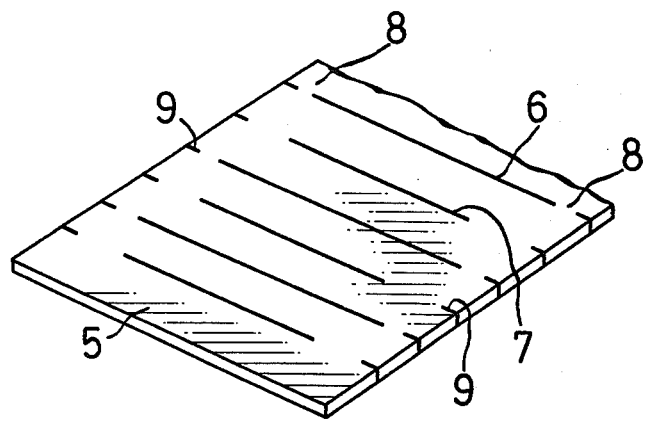
FIG. 9 is a partially cut-away perspective view of a metallic plate for use in a core member of a second embodiment of the present invention.

As shown in FIG. 9, transversely extending long slits 6 and transversely extending short slits 7 are perforated in the band-shaped metallic plate 5 alternately at predetermined intervals. And slits 9 of which length is equal with each other are perforated in both side edges of the thin plate 5 so as to be opposed to each of the slits 6 and slits 7. As a result, connecting portions 8 are formed between each of both ends of the slits 6 and 7 and each of ends of the slits 9 in a longitudinal direction of the metallic plate. The width of the connecting portions is narrower every two slits.

Next, the portions defined by the ends of the slits 9 and the ends of the slits 7 are rolled into a longitudinal direction thereof. As a result, slits are enlarged and the metallic plate 5 is elongated into a longitudinal direction thereof.

Figure 10:
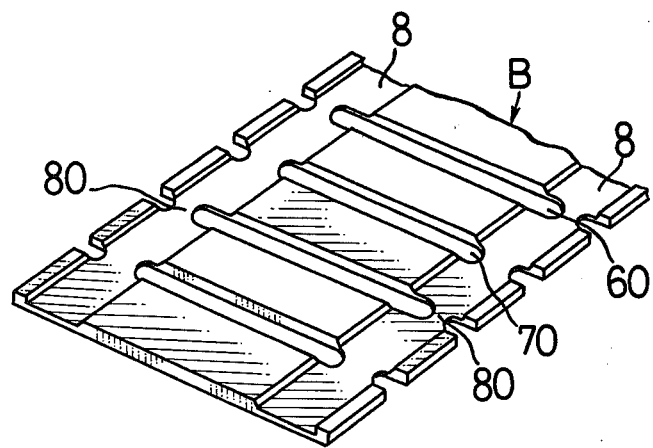
FIG. 10 is a partially cut-away perspective view of a core member obtained from the metallic plate as shown in FIG. 9.

In the obtained core member B as shown in FIG. 10, the connecting portions 8 is rolled thin while both side edge portions of the metallic plate 5 are maintained thick as before.

The obtained core member B is covered with a covering material, divided into core pieces in narrower connecting portions 80 and bent into a desired cross-sectional shape in the same process as that of the first embodiment.

According to the second embodiment, the same operation effects as those of the first embodiment can be obtained.

In addition, since the both side edge portions are maintained thicker, there is no danger that the side edge portions of the core pieces are exposed from the covering material even if the trim is bent in the side edge portions of the core pieces with a large curvature, when it is attached.

In the second embodiment, by changing the length of the centrally arranged slits 6 and 7 (central slits), the width of the connecting portions are changed.

Figure 11:
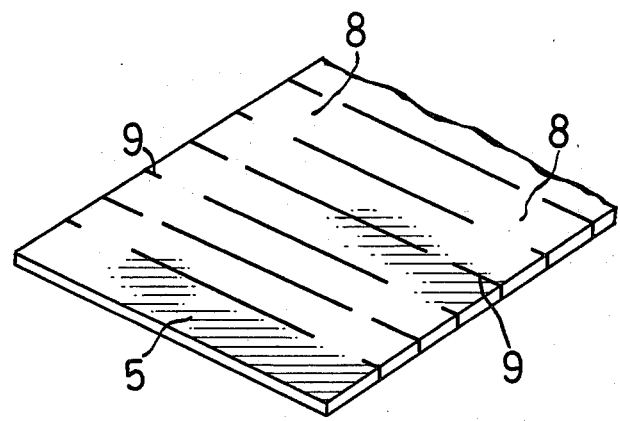
FIG. 11 is a partially cut-away perspective view of a metallic plate for use in a core member of a modified embodiment of the present invention.
Figure 12:
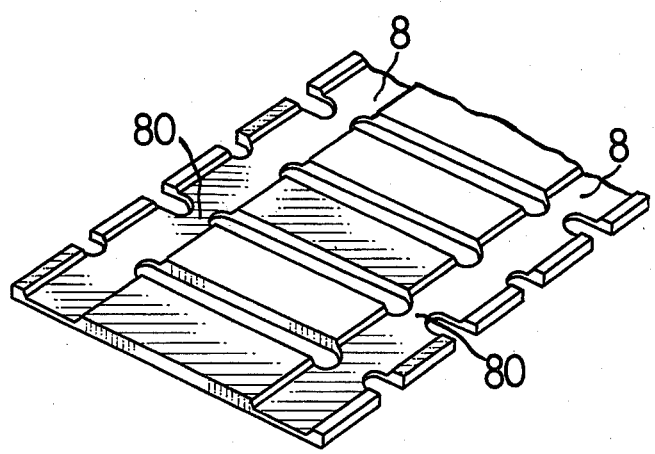
FIG. 12 is a partially cut-away perspective view of a core member obtained from the metallic plate as shown in FIG. 11.

By changing the length of the slits 9 (side slits) perforated in both side edge portions of the metallic plate as shown in FIGS. 11 and 12, while the length of the central slits 6 and 7 is maintained equal, the same operation effect as that of the second embodiment can be obtained.

Furthermore, the side slits 9 can be provided every two central slits 6 or 7 which are perforated centrally in the metallic plate.

And the narrower connecting portions can be provided every three or four slits perforated in the metallic plate in accordance with the contour and the like of the place to which the trim is attached.

As described above, the trim wherein a plurality of divided core pieces are embedded is produced by perforating a plurality of transversely extending slits in a band-shaped metallic plate to form unslit longitudinally extending connecting portions in both side end portions thereof, of which width is narrower at predetermined intervals, rolling the connecting portions in a longitudinal direction thereof to enlarge the slits into transversely extending slots, covering the obtained rolled core member with a covering material, applying a bending force to the covered core member in a vertical direction thereof to divide it into a plurality of core pieces and bending the covered and divided core member into a predetermined shape.

According to the present invention, the core members can be produced with good production efficiency.

And the core member of the present invention can be easily and certainly broken in predetermined narrower portions thereof. The obtained core member is excellent in its elasticity, flexibility and shape-retentivity.

In particular, the trim of the present invention exhibits extremely excellent operation effect in attaching to the curved place having a large curvature.

Having now fully described the invention, it will be apparent to one of ordinary skill in the art that many changes and modifications can be made thereto without departing from the spirit or scope of the invention as set forth herein.

What is claimed is:

1. A method for producing a channel-shaped trim including a core member embedded within a covering material and having a longitudinally extending opening for embracing and clamping an edge flange of a support member comprising the steps of:
    preparing a core member from a band-shaped metallic plate by perforating a plurality of transversely extending slits in said plate, so as to be arranged in a longitudinal direction thereof at predetermined intervals, the length of said slits being made larger every at least two slits, thereby to form a series of unslit connecting portions in both side end portions of said plate, of which width is made narrower at predetermined intervals in accordance with the length of said slits; and by rolling said series of unslit connecting portions in a longitudinal direction of said plate so as to make said connecting portions thin and enlarge said transversely extending slits into slots having a predetermined width in a longitudinal direction of said plate;
    covering said core member with a covering material to form a covered core member;
    applying a bending force to said covered core member in a vertical direction thereof to break said core member in said narrower connecting portions in a transverse direction of said member and to divide said core member into a plurality of core pieces within said covering material; and
    bending said plurality of core pieces divided within said covering material to form a channel-shaped trim having a longitudinally extending opening for embracing and clamping an edge flange of a support member.

2. The method for producing a channel-shaped trim according to claim 1, wherein:
    said transversely extending slits are perforated in a central portion of said plate in a transverse direction thereof; and
    said connecting portions are formed in the spaces between both ends of each of said slits and both side edges of said plate.

3. The method for producing a channel-shaped trim according to claim 1, wherein:
    each of said transversely extending slits is composed of a slit assembly which consists of one central slit and two side slits, which are arranged in line in a transverse direction of said plate, said central slit being perforated in a central portion of said plate and said side slits being perforated in both side edges thereof so as to be spaced from said central slit; and
    said connecting portions are formed between both ends of said central slit and ends of said side slits.

4. The method for producing a channel-shaped trim according to claim 3, wherein:
    the length of said central slits is made larger every at least two slits; and
    the length of said side slits is made equal.

5. The method for producing a channel-shaped trim according to claim 3, wherein:
    the length of said central slits is made equal; and
    the length of said side slits is made larger every at least two slits.

* * * * *